United States Patent [19]
Astle

[11] Patent Number: 6,020,926
[45] Date of Patent: *Feb. 1, 2000

[54] MOTION ESTIMATION BLOCK MATCHING SPEEDUP

[75] Inventor: Brian Astle, Phoenix, Ariz.

[73] Assignee: Intel Corporation, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 09/002,071

[22] Filed: Jan. 22, 1998

Related U.S. Application Data

[63] Continuation of application No. 08/366,826, Dec. 30, 1994, abandoned.

[51] Int. Cl.[7] .................................................. H04N 7/32
[52] U.S. Cl. ........................ 348/416; 348/420; 348/699
[58] Field of Search ................................. 348/384, 390, 348/400–402, 405, 407–413, 415, 416, 420, 699, 700; 382/232, 236, 238; H04N 7/32

[56] References Cited

U.S. PATENT DOCUMENTS

| | | |
|---|---|---|
| 4,849,810 | 7/1989 | Ericsson . |
| 4,868,653 | 9/1989 | Golin et al. ............................. 348/390 |
| 4,984,076 | 1/1991 | Watanabe et al. ...................... 348/405 |
| 5,019,901 | 5/1991 | Uomori et al. . |
| 5,126,841 | 6/1992 | Tanaka et al. . |
| 5,150,209 | 9/1992 | Baker . |
| 5,151,784 | 9/1992 | Lavagetto et al. . |
| 5,173,773 | 12/1992 | Ueda et al. . |
| 5,198,901 | 3/1993 | Lynch . |
| 5,251,028 | 10/1993 | Iu . |
| 5,329,318 | 7/1994 | Keith . |
| 5,436,666 | 7/1995 | Astle . |
| 5,440,346 | 8/1995 | Alattar et al. ........................... 348/416 |
| 5,459,518 | 10/1995 | Wickstrom et al. .................... 348/420 |

*Primary Examiner*—Richard Lee
*Attorney, Agent, or Firm*—Duane, Morris & Heckscher LLP; William H. Murray; N. Stephan Kinsella

[57] ABSTRACT

In a digital video motion estimation compression and decompression system, pixel block-matching is accomplished by comparing pixels in target block regions of high gradients of luminance or hue. A few pixels from low-gradient regions are also preferably used. A mask defining these pixel locations in the target block is created, and the block comparisons with other blocks are based only on the relative values associated with the pixels in these locations. Major computational time savings are accomplished with negligible degradation of image quality.

23 Claims, 8 Drawing Sheets

| 2 | 2 | 2 | 2 | 2 | 5 | 8 | 9 |
|---|---|---|---|---|---|---|---|
| 2 | 2 | 2 | 2 | 2 | 5 | 8 | 9 |
| 1 | 1 | 1 | 1 | 1 | 4 | 8 | 9 |
| 1 | 1 | 1 | 1 | 1 | 5 | 9 | 9 |
| 1 | 1 | 1 | 1 | 1 | 6 | 9 | 9 |
| 1 | 1 | 1 | 1 | 2 | 7 | 9 | 9 |
| 1 | 1 | 1 | 1 | 3 | 8 | 9 | 9 |
| 1 | 1 | 1 | 1 | 4 | 9 | 9 | 9 |
FIG. 5
|   |   |   |    |    |    |   |
|---|---|---|----|----|----|---|
|   | 1 | 1 | 1  | 10 | 37 | 16 |
|   | 1 | 1 | 1  | 10 | 49 | 26 |
|   | 0 | 0 | 0  | 16 | 68 | 17 |
|   | 0 | 0 | 0  | 26 | 68 | 9  |
|   | 0 | 0 | 1  | 40 | 53 | 4  |
|   | 0 | 0 | 4  | 53 | 40 | 1  |
|   |   |   |    |    |    |   |
"S"  FIG. 7
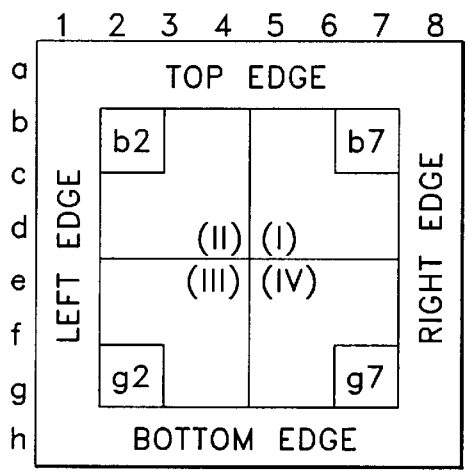
FIG. 6
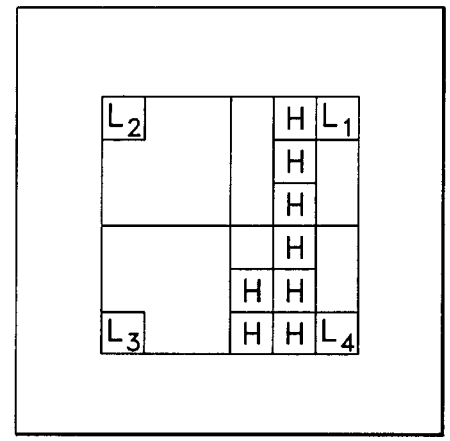
FIG. 8

|   |   |   |    |    |    |   |
|---|---|---|----|----|----|---|
|   | 1 | 1 | 1  | 10 | 19 | 10 |
|   | 1 | 1 | 1  | 10 | 27 | 18 |
|   | 0 | 0 | 0  | 16 | 34 | 17 |
|   | 0 | 0 | 0  | 26 | 36 | 9  |
|   | 0 | 0 | 1  | 28 | 31 | 4  |
|   | 0 | 0 | 4  | 31 | 28 | 1  |
|   |   |   |    |    |    |   |

"$V_1$"  FIG. 9

|   |   |   |   |    |   |
|---|---|---|---|----|---|
|   | 1 | 1 | 1 | 4  | 7 | 4 |
|   | 1 | 1 | 1 | 4  | 9 | 6 |
|   | 0 | 0 | 0 | 4  | 10 | 5 |
|   | 0 | 0 | 0 | 6  | 10 | 3 |
|   | 0 | 0 | 1 | 8  | 9 | 2 |
|   | 0 | 0 | 2 | 9  | 8 | 1 |
|   |   |   |   |    |   |

"$V_2$"  FIG. 10

MOTION ESTIMATION BLOCK MATCHING SPEEDUP

This is a continuation of U.S. patent application Ser. No. 08/366,826, filed Dec. 30, 1994, now abandoned.

BACKGROUND OF THE INVENTION

1. Field of the Invention

The present invention relates to signal processing and, in particular, to computer-implemented processes and apparatus for efficient block comparisons in motion estimation systems.

2. Description of the Related Art

Motion estimation is commonly utilized by video encoders in signal processing techniques that compress successive frames of digital video data ("video frames"). When these video frames are to be transmitted via a communication medium of limited bandwidth, or are to be stored in a storage medium having limited storage capacity, it is often desirable to first compress the digital data which represents each frame, so as to reduce the amount of data that needs to be transmitted.

Motion estimation is one of the most computationally intense of the various techniques utilized to compress data. Motion estimation techniques exploit the temporal correlation that often exists between consecutive video frames, in which there is a tendency for objects or image features to move from one location to another on a display device from frame to frame.

For instance, frame 1 may contain an object, and frame 2 may contain a set of pixels corresponding to the same object spatially displaced by a few pixels from the location in frame 1. If frame 1 is transmitted to and received by a pixel processor or video processor (which performs any necessary decompression or other decoding), frame 2 may be transmitted without including the pixel data corresponding to the object. Instead, motion vectors (i.e. "pointers") are sent along with frame 2 (which may also be compressed using other techniques). These motion vectors may be utilized by the receiving video processor when decoding the received video frame 2 to reproduce the object from frame 1 at a new location within frame 2. Since such motion vectors can be represented with fewer bits than the pixels that comprise the object, fewer bits need to be transmitted (or stored) in order to recreate the object in frame 2.

The motion estimation procedure may be performed at the encoder level by comparing given regions or blocks within a current video frame to many regions or blocks within the previous video frame. The process of comparing a given block of one frame to a block of another frame is called "block matching." Blocks are matched by determining a "comparison measurement" between any given pair of blocks. A comparison measurement corresponds to some form of indication of a degree of "difference" between the two regions. If the comparison measurement is below a predetermined threshold, the blocks may be considered to be similar enough that a block match is indicated. If so, the block in the previous video frame may be utilized as described above by the video decoder to reproduce a duplicate block in the current video frame.

In performing such comparisons, a number of pixels from the previous video frame are accessed for each block of the current video frame that is subjected to motion estimation. In most general purpose video processing systems, the bit maps corresponding to the previous and current video frame pixels are stored in general purpose memory connected to the video processor through a bus. For each block matching procedure the video processor must access the memory many times, which may constitute a high amount of traffic on the bus and a high number of memory accesses. Because of the limited bandwidth of the bus by which the memory is accessed, these memory accesses can tie up use of the bus and memory and thus slow down overall operation of the video processing system.

To avoid this problem, the video processor performing the motion estimation step may contain, for example, a dedicated, special-purpose memory space to store the two video frames being compared so that there is less traffic on the bus. However, such a special-purpose memory space is often unavailable, unfeasible, or otherwise not desired because of the extra complexity of such a special-purpose memory. The special-purpose memory space may be too costly. Further, even a special purpose memory space may be accessed so often during block matching that the video processor may be slowed down.

What has been done in the past is to look at all the luminance values of the pixels within a block and to use a standard criterion (such as mean absolute error or mean square error) to accomplish accurate block matching. In their report of research done in connection with the Office of Naval Research under grant Number N00014-89-J1327, Andre Azccarin, et al, disclose a technique for using a pseudo-randomly selected subsampled set of pixel values in a target block to reduce the amount of computation needed for block matching. Their approach is useful in some circumstances, but does not take advantage of special identifying features of certain blocks.

It is accordingly an object of this invention to improve upon the techniques of the known art and to provide a method and apparatus that more efficiently uses available data to perform accurate and speedy block matching.

Further objects and advantages of this invention will become apparent from the Detailed Description of preferred embodiments which follows.

SUMMARY OF THE INVENTION

Applicant has discovered that a major benefit can be obtained by doing a simple analysis of the "target" block prior to comparing other blocks to it in a block matching search. This analysis is for the purpose of identifying special, (i.e. "prominent") features of the target block. Then, instead of using all the pixels in the target block for matching purposes, mainly the pixels of the special features of the block are used (along with a few general pixels) to do comparisons with other blocks. In other words, a special mask is created that identifies mainly the pixels of the target block that are associated with prominent features of that block. Then comparisons with other blocks are done using just the pixels in the other blocks that correspond to the target block's mask pixels. This allows accurate block matching while comparing many fewer pixels in the respective blocks than would otherwise normally be used with prior art techniques. By using a few extra computations to identify the suitable mask pixel locations of the target block, a very significant improvement in the efficiency of the search for a suitable matching block is accomplished.

BRIEF DESCRIPTION OF THE DRAWING

These and other features, aspects, and advantages of the present invention will become more fully apparent from the following description, appended claims, and accompanying drawing, in which:

FIG. 5 shows an example of a typical 8×8 target block with luminance ("Y") values for the 64 pixels thereof.

FIG. 6 shows a way to divide an 8×8 block into sectors.

FIG. 7 depicts the calculated internal "slope" values for the block of FIG. 5.

FIG. 8 is an example of a target "mask" that could be used to identify prominent features of the target block of FIG. 5.

FIG. 9 shows the internal "variance" values $V_1$ for the target block of FIG. 5.

FIG. 10 shows the internal "variance" values $V_2$ for the target block of FIG. 5.

DETAILED DESCRIPTION

Figure 1:
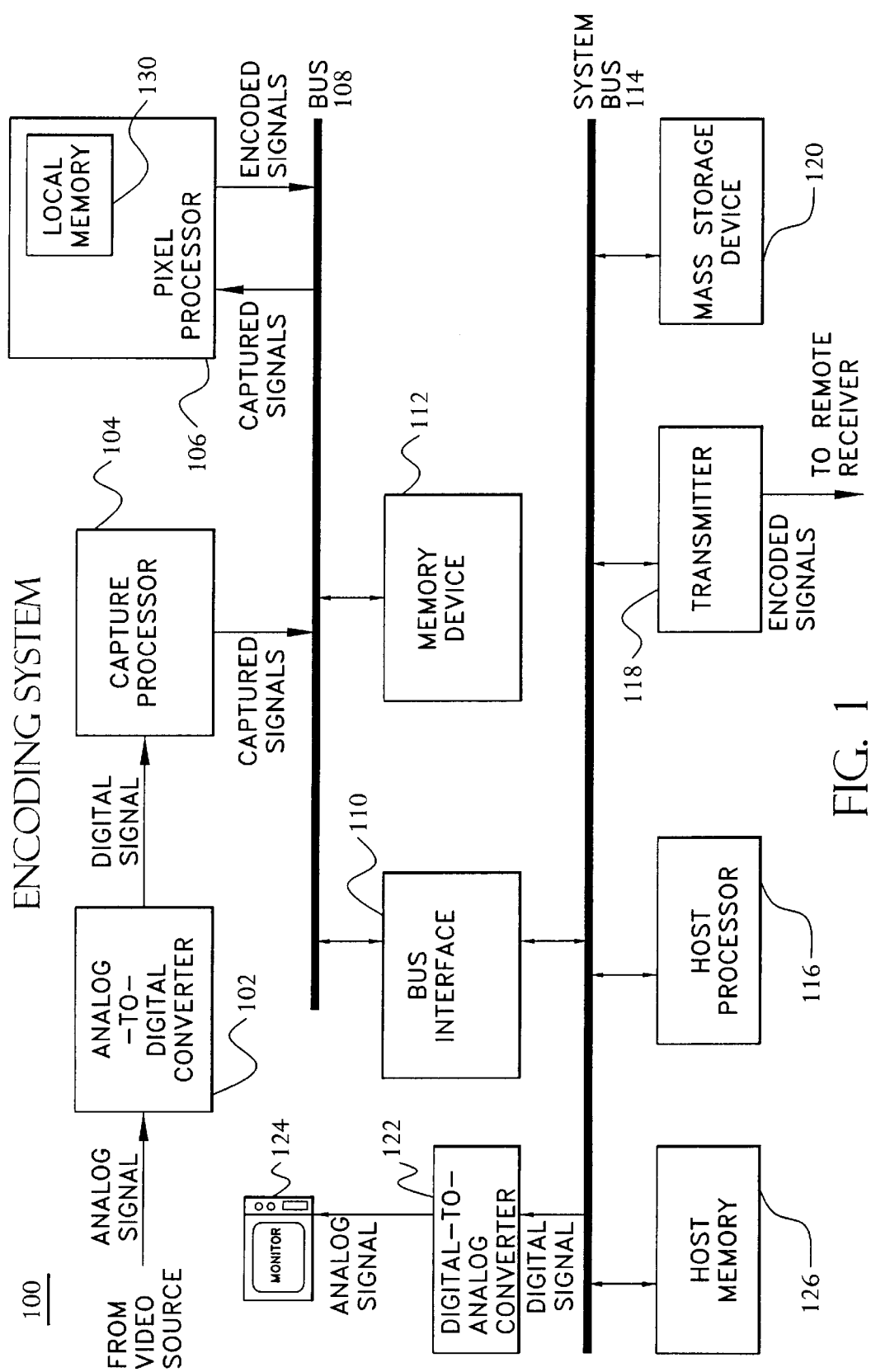
FIG. 1 is a computer-based encoding system for encoding video signals, according to a preferred embodiment of the present invention.

Referring now to FIG. 1, there is shown a computer-based encoding system 100 for encoding video image signals, according to a preferred embodiment of the present invention. Analog-to-digital (A/D) converter 102 of encoding system 100 receives analog video image signals from a video source. The video source may be any suitable source of analog video image signals such as a video camera or VCR for generating local analog video image signals or a video cable or antenna for receiving analog video image signals from a remote source. A/D converter 102 decodes (i.e., separates the signal into constituent components) and digitizes each frame of the analog video image signals into digital image component signals (e.g., in a preferred embodiment, Y, U, and V component signals).

Capture processor 104 receives, captures, and stores the digitized component signals as subsampled video images in memory device 112 via bus 108. Each subsampled video image is represented by a set of two-dimensional component planes or pixel bitmaps, one for each component of the digitized video image signals. In a preferred embodiment, capture processor 104 captures video image signals in a YUV 4:1:1 format, in which every (4×4) block of pixels of the Y component plane corresponds to a single pixel in the U component plane and a single pixel in the V component plane. Alternatively, a YUV 2:1:1 format can be used.

Pixel processor 106 accesses captured bitmaps from memory device 112 via bus 108 and generates encoded image signals that represent one or more of the captured video images. Depending upon the particular encoding method implemented, pixel processor 106 applies a sequence of compression techniques to reduce the amount of data used to represent the information in each image. The compression method of motion estimation in accordance with the present invention will be further described below. The encoded image may then be stored to memory device 112 via bus 108 for transmission to host processor 116 via bus 108, bus interface 110, and system bus 114 for storage in host memory 126. Pixel processor 106 also may contain local memory 130, which is a tightly-coupled on-chip memory suitable for locally storing a number of pixels and other data. Those skilled in the art will appreciate that system bus 114 and bus 108 may be merged into the same system bus 114. It will further be understood that host processor 116 may in alternative preferred embodiments perform the functions of pixel processor 106 described herein. Similarly, in alternative preferred embodiments a general memory device such as host memory 126 or memory device 112 may perform the functions of local memory 130 described herein.

Host processor 116 may transmit the encoded image to transmitter 118 for real-time transmission to a remote receiver (not shown in FIG. 1), store the encoded image to mass storage device 120 for future processing, or both. In addition, digital-to-analog converter 122 may receive and convert digital image signals to analog image signals for display in one or more windows on monitor 124. These image signals may correspond, for example, to raw captured video images or companded video images (i.e., the results of compressing and decompressing selected captured video images).

Figure 2:
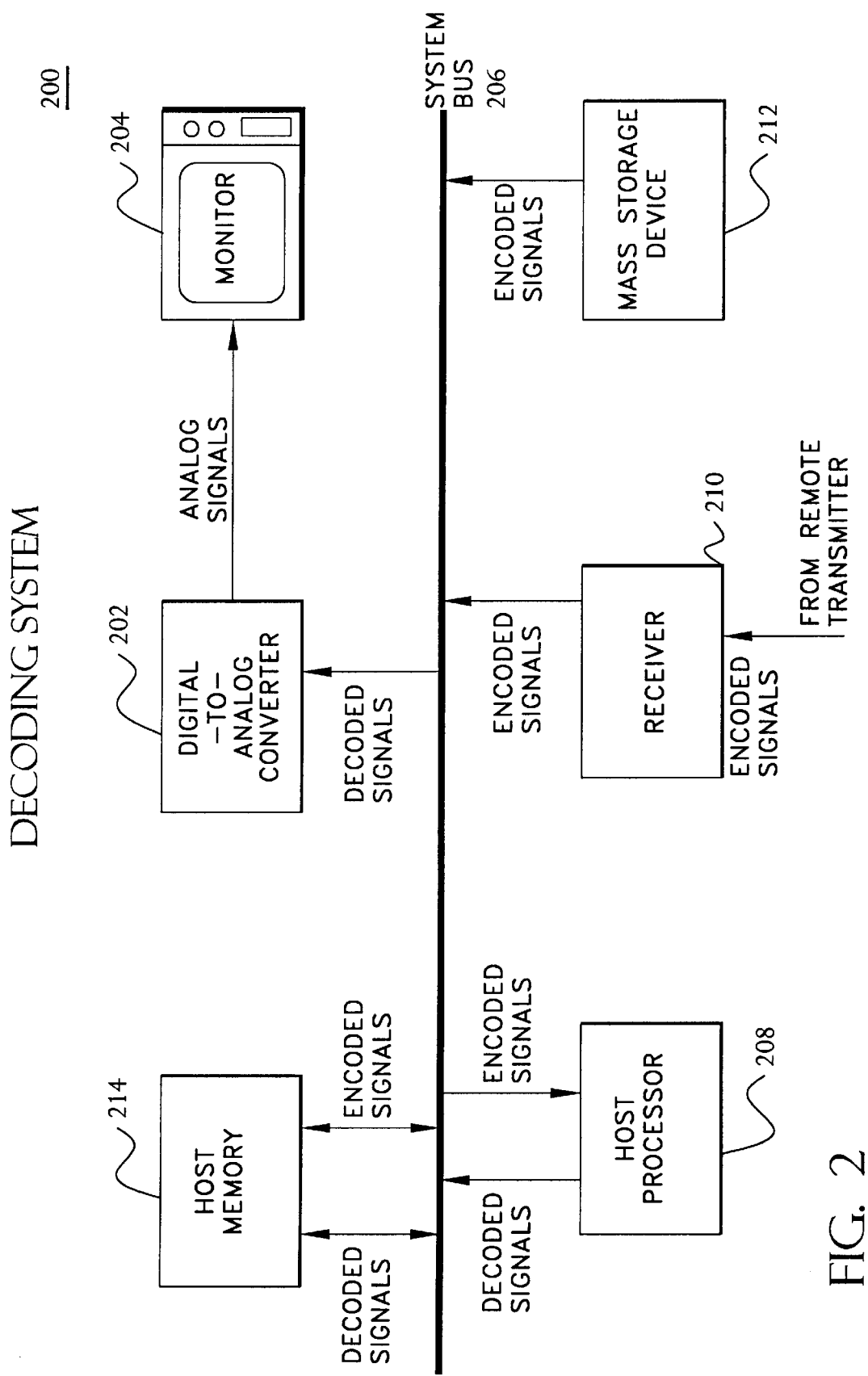
FIG. 2 is a computer-based decoding system for decoding the video signals encoded by the computer system of FIG. 1, according to a preferred embodiment of the present invention.

Referring now to FIG. 2, there is shown a computer-based decoding system 200 for decoding the image signals encoded by encoding system 100 of FIG. 1, according to a preferred embodiment of the present invention. Host processor 208 of decoding system 200 receives encoded image signals via system bus 206 that were either stored in mass storage device 212 or received by receiver 210 from a remote transmitter, such as transmitter 118 of FIG. 1. The host processor 208 temporarily stores the encoded image signals in host memory 214.

Host processor 208 decodes the encoded image signals and scales the decoded image signals for display. Decoding the encoded image signals involves undoing the compression processing implemented by pixel processor 106 of encoding system 100 of FIG. 1. Scaling the decoded image signals involves upsampling the U and V component signals to generate full-sampled Y, U, and V component signals in which there is a one-to-one-to-one correspondence between Y, U, and V pixels in the scaled component planes. Scaling may also involve scaling the component signals to a display size and/or resolution different from the image signals as original captured. Host processor 208 then stores the scaled decoded image signals to host memory 214 for eventual transmission to digital-to-analog (D/A) converter 202 via system bus 206. D/A converter converts the digital scaled decoded image signals to analog image signals for display on monitor 204.

Referring again to FIG. 1, encoding system 100 is preferably a general microprocessor-based personal computer (PC) system with a special purpose video-processing plug-in board. In particular, A/D converter 102 may be any suitable means for decoding and digitizing analog video image signals. Capture processor 104 may be any suitable processor for capturing digitized video image component signals as subsampled frames. Pixel processor 106 may be any suitable means for encoding subsampled video image signals, where the means is capable of implementing functions such as a forward discrete cosine transform and a motion estimation and block matching procedures as described in further detail below. Memory device 112 may be any suitable computer memory device and is preferably a dynamic random access memory (DRAM) device. Bus 108 may be any suitable digital signal transfer device and is preferably an Industry Standard Architecture (ISA) bus or Extended ISA (EISA) bus or a Peripheral Component Interface (PCI) bus. Bus interface 110 may be any suitable means for interfacing between bus 108 and system bus 114. In a preferred embodiment, A/D converter 102, capture processor 104, pixel processor 106, bus 108, bus interface 110, and memory device 112 are contained in a single plug-in board, such as an Intel® ActionMedia®-II board, capable of being added to a general microprocessor-based personal computer (PC) system.

Host processor 116 may be any suitable means for controlling the operations of the special-purpose video processing board and is preferably an Intel® general purpose microprocessor such as an Intel® Pentium® processor. Host memory 126 may be any suitable memory device used in conjunction with host processor 116 and is preferably a combination of random access memory (RAM) and read-only memory (ROM). System bus 114 may be any suitable digital signal transfer device and is preferably a PCI bus. Alternatively, system bus 114 may be an Industry Standard Architecture (ISA) bus or Extended ISA (EISA) bug. Mass storage device 120 may be any suitable means for storing digital signals and is preferably a computer hard drive. Transmitter 118 may be any suitable means for transmitting digital signals to a remote receiver and is preferably transmits digital signals over PSTN lines. Those skilled in the art will understand that the encoded video signals may be transmitted using any suitable means of transmission such as telephone line (PSTN or ISDN), RF antenna, local area network, or remote area network.

D/A converter 122 may be any suitable device for converting digital image signals to analog image signals and is preferably implemented through a personal computer (PC)-based display system such as a VGA or SVGA system. Monitor 204 may be any means for displaying analog image signals and is preferably a VGA monitor.

Referring now again to FIG. 2, decoding system 200 is preferably a general microprocessor-based personal computer (PC) system similar to the basic PC system of encoding system 100. In particular, host processor 208 may be any suitable means for decoding and scaling encoded image signals and is preferably an Intel® general purpose microprocessor such as an Intel® Pentium® processor. Host memory 214 may be any suitable memory device used in conjunction with host processor 116 and is preferably a combination of random access memory (RAM) and read-only memory (ROM). In an alternative preferred embodiment, decoding system 200 may also have a pixel processor similar to pixel processor 106 of FIG. 1 for decoding the encoded image signals and a display processor such as an Intel® i750® Display Processor for scaling the decoded image signals.

System bus 206 may be any suitable digital signal transfer device and is preferably an Industry Standard Architecture (ISA) bus or Extended ISA (EISA) bus. Mass storage device 212 may be any suitable means for storing digital signals and is preferably a CD-ROM device. Receiver 210 may be any suitable means for receiving the digital signals transmitted by transmitter 118 of encoding system 100. D/A converter 202 may be any suitable device for converting digital image signals to analog image signals and is preferably implemented through a personal computer (PC)-based display system such as a VGA or SVGA system. Monitor 204 may be any means for displaying analog image signals and is preferably a VGA monitor.

In a preferred embodiment, encoding system 100 of FIG. 1 and decoding system 200 of FIG. 2 are two distinct computer systems. In an alternative preferred embodiment of the present invention, a single computer system comprising all of the different components of systems 100 and 200 may be used to encode and decode video image signals. Those skilled in the art will understand that such a combined system may be used to display decoded video image signals in real-time during the capture and encoding of other video signals.

Figure 3:
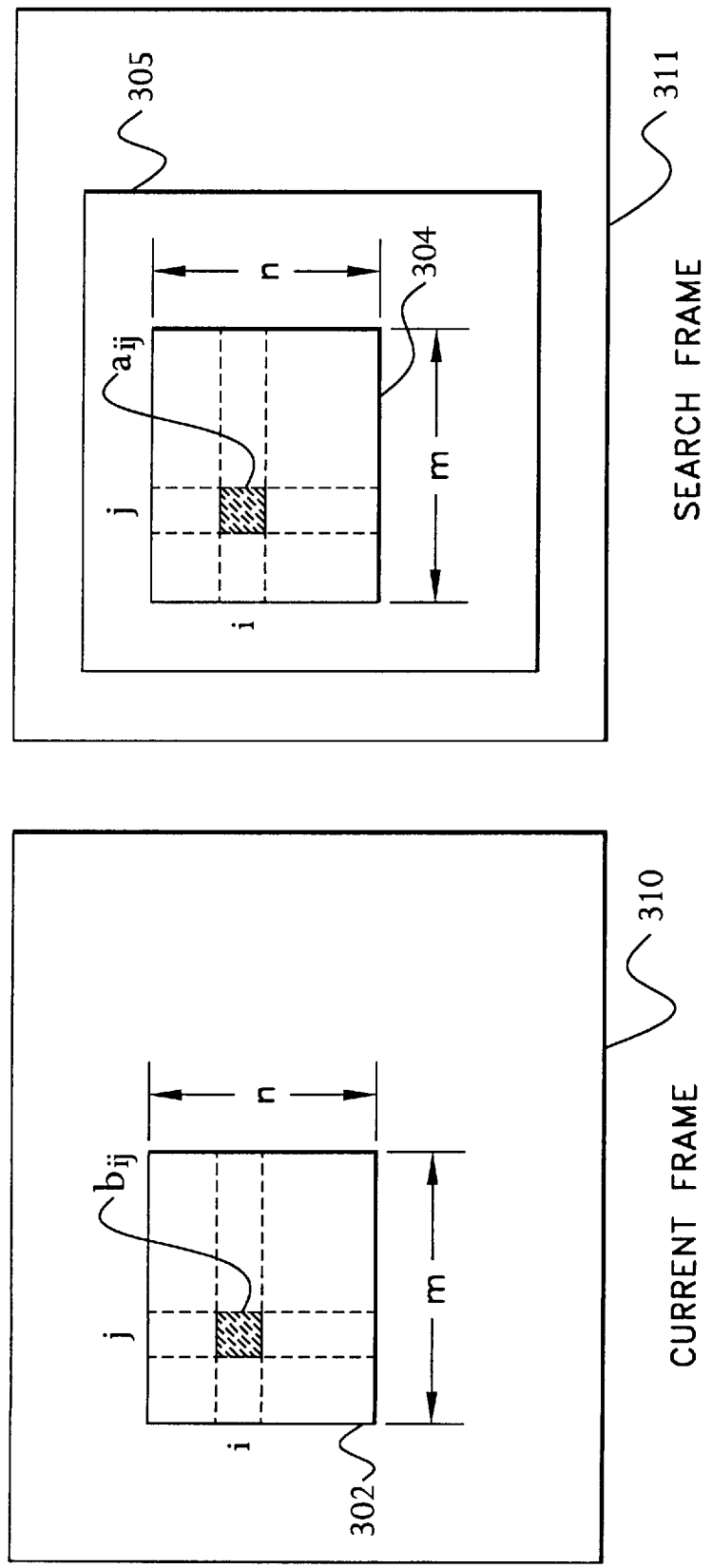
FIG. 3 depicts reference and search frames having reference and search blocks and a search area utilized in motion estimation by the computer system of FIG. 1, according to a preferred embodiment of the present invention.

Referring now to FIG. 3, there are shown current frame 310 and search frame 311 stored in memory device 112. Current frame 310 and search frame 311 are two of the most recent video frame frames of a plurality of consecutive video frames. Current frame 310 is the current video frame being compressed, and search frame 311 is a previously-decoded video frame, preferably the immediately previously-decoded video frame, which is searched by a motion estimation procedure for block matches between search frame 311 and current frame 310. Current frame 310 contains reference block 302, and search frame 311 contains search block 304 and search area 305.

Reference and search frames 310 and 311 may be of any pixel size, and in a preferred embodiment have a size of (240×352) pixels, i.e. 240 rows ×352 columns of pixels. When performing block matching operations for motion estimation, current frame 310 is divided into a number of smaller regions or blocks such as reference block 302. Reference block 302 (as well as search blocks such as search block 304) may be of various sizes and shapes. In a preferred embodiment, reference block 302 contains an 8×8 array of pixels. In an alternative preferred embodiment of the present invention, reference block 302 contains a (16×16) block of pixels. In further alternative preferred embodiments, reference block 302 contains, in general, (n ×m) pixels, where n is the number of rows and m is the number of columns.

When performing block matching for purposes of motion estimation, reference block 302 is compared with various search blocks such as search block 304 of search frame 311, and the aforementioned comparison measurement which represents an indication of a degree of variation between a reference block 302 and a given search block 304 is determined. If this comparison value is sufficiently low, e.g. below a predetermined threshold value, a match is indicated. If a match is indicated, a motion vector which indicates the location of the matching search block 304 in search frame 311 as well as the location of reference block 302 in current frame 310, may be transmitted by pixel processor 106 to remote receiver 210. It will be appreciated that other data corresponding to current frame 310 may be transmitted as well, for example data compressed with other techniques that represent other blocks within current frame 310.

Since the decoding system of FIG. 2 should already have received previously-transmitted search frame 311 containing search block 304 (where search frame 311 may have itself been compressed and then decompressed), search block 304 from search frame 311 may be used with the transmitted motion vector to reproduce reference block 302 when decompressing current frame 310. It will be understood that if a lower threshold value is utilized in block matching, it will be more difficult to find a matching block, and the motion estimation procedure may take longer, but more accurate results may be obtained. By the same token, if a higher threshold value is utilized a "match" will likely be found more quickly but potentially less accurate results might be obtained. In practice it is sometimes desirable to employ two thresholds: (1) a "stopping" threshold, which, when reached, promptly stops the search altogether; and (2) a "matching" threshold, which is typically greater than (but never less than) the stopping threshold. If the stopping threshold is never reached, then, upon completion of the search, a match is declared for the block that yields a comparison value furthest below the matching threshold. It will further be understood that if no match is found during the motion estimation process then reference block 302 might not be able to be reconstructed from a similar block from the previous search frame 311, and may therefore need to be transmitted in its entirety (for example, after being compressed by other data compression methods such a discrete cosine transform, or a slant transform).

Given two blocks such as reference block 302 and search block 304 which are to be compared with each other to determine if there is a match, a comparison measurement is performed by encoding system 100. The basis of such comparison is often a standard calculation known as the "$L_1$ Norm" (i.e. the "absolute value of the difference" norm) which has the following form:

$$L_1 \; Norm = \sum_{i=0}^{i=n} \sum_{j=0}^{j=m} |a_{ij} - b_{ij}|$$

where:

$a_{ij}$ is a value of a pixel in the ith row and jth column of search block 304;

$b_{ij}$ is a value of a pixel in the ith row and jth column of reference block 302;

n is the number of rows in a block; and m is the number of columns in a block.

It will be appreciated that the lower the difference indicated by the $L_1$ Norm calculation, the more similar are the reference and search blocks being compared. It will further be appreciated that the likelihood of finding a match increases if more search blocks are compared against reference block 302, i.e. if more comparison measurements are determined. For example, an exhaustive block matching comparison may be performed, where, for each reference block 302 within current frame 310, the $L_1$ Norm is calculated for every search block 304 within search frame 311, or at least until a "match" below a certain threshold is found. It will be understood that the search blocks within search frame 311 may be displaced from each other by only one pixel or one fractional pixel horizontally or vertically and thus may overlap many neighboring search blocks by a substantial number of pixels. With fractional pixels, typically, linear interpolation is used; however, higher order interpolation such as "cubic" or "spline" can be used. In such an exhaustive search, the first search block 304 may be chosen as the search block in the uppermost and left most corner of search frame 311, the next may be the search block one pixel displacement to the right of this block (which overlaps the previous search block to some extent), and so on until reference block 302 is exhaustively compared against each possible search block 304 within search frame 311. Once the best integer pixel position is found, then a fractional pixel search nearby can be employed to find the best match.

Because such an exhaustive motion estimation procedure may be very computationally intensive, often the block matching performed by pixel processor 106 during the motion estimation procedure is performed on only a subset of possible search blocks within search frame 311. Because oftentimes a temporal correlation occurs between successive video frames such as search frame 311 and current frame 310, it is often statistically likely that any potential matches that exist will be found within a local region surrounding the location of reference block 302, perhaps even at the same location as reference block 302. The reason for this is that image features often will not move by very many pixels, if at all, from frame to frame. Therefore, a search area such as search area 305 may be selected as a subset of search frame 311. However, it will be understood that search area 305 may be as large as search frame 311 itself. When, for example, an exhaustive block matching comparison is performed by comparing a reference block 302 to each search block 304 within search frame 311, search area 305 may be considered to be equal to the entire search frame 311. In a preferred embodiment, search area 305 is a proper subset of search frame 311 and any given search block 304 is selected from search area 305, thus yielding a smaller possible number of search blocks, and consequently a smaller number of $L_1$ Norm measurements and related determinations and computations that must be performed. Those skilled in the art will appreciate that search area 305 may be (in alternative preferred embodiments) of any generalized size (pxq), to contain a selected number of search blocks 304.

Figure 4A:
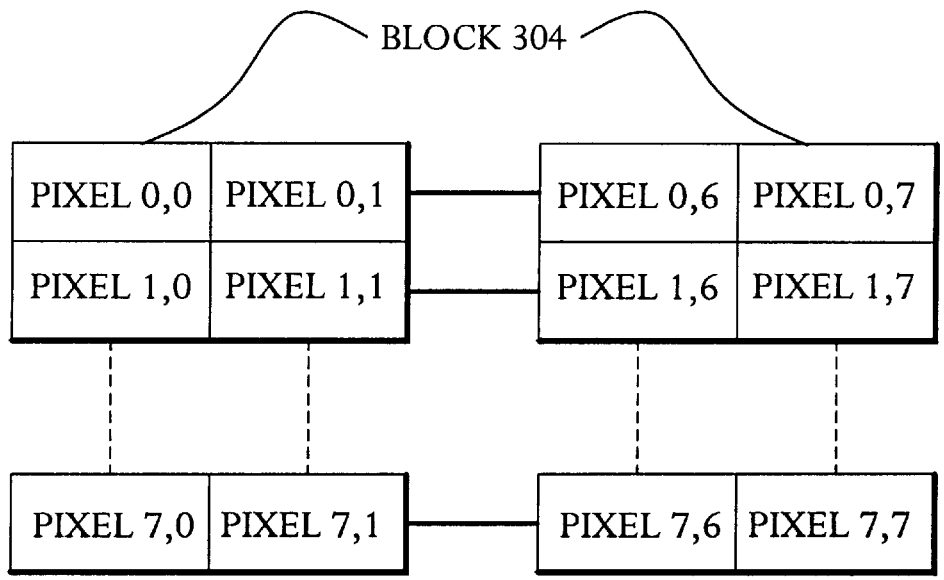
FIGS. 4A and 4B illustrate the ordering of pixels within the search block of FIG. 3, and the ordering of search blocks within the search frame of FIG. 3, respectively.
Figure 4B:
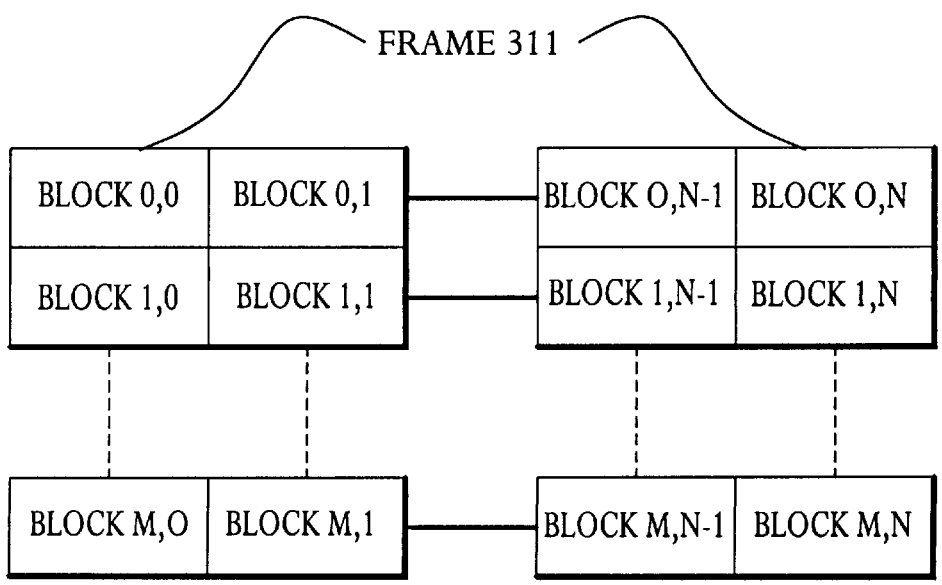

Referring now to FIGS. 4A and 4B, there is illustrated the ordering of pixels within search block 304 and the ordering of search blocks such as search block 304 within search frame 311. As shown in FIG. 4A, a given pixel i,j of an (8×8) search block 304 is located at the ith row and jth column of the block. Thus, pixel 0,0 is located in the upper left corner of search block 304 while pixel 0,7 is located in the upper right corner of search block 304. FIG. 4B shows the ordering of possible search blocks 304 within search frame 311, which are labelled in a manner similar to the pixels of FIG. 4A, where there are (M×N) search blocks within search frame 311.

It will be appreciated that calculations other than the above-described "$L_1$ Norm" may be utilized to perform comparison measurements between reference and search blocks. For example, an "$L_2$ Norm" (i.e. the "square of the absolute value of the difference" norm) has the following form:

$$L_2 \; Norm = \sum_{i=0}^{i=n} \sum_{j=0}^{j=m} (a_{ij} - b_{ij})^2.$$

The above-described norms ($L_1$ and $L_2$) are useful for block matching comparisons, but a great deal of computation is necessary to proceed with "brute force" block matching based thereon.

One method of speeding up the desired block matching relates to simplifying the block matching criteria. Instead of using the pseudo-random selection techniques of Andre Zacherin (as mentioned in the BACKGROUND section of this Application), the instant invention involves the selection of target block pixel masks based upon special features of the video image. In particular, Applicant has discovered that it is very useful to take the time to analyze a target block to determine if it exhibits any relatively steep "slopes" or "variances" or other unusual characteristics within the area of the block. (This is somewhat analogous to identifying a person by means of a facial scar rather than by the person's face alone.) It should be noted that the efficiencies of this technique arise because only the target block need be analyzed for special features, since the blocks to be compared with it will have the pertinent pixels identified by means of a "mask" determined from the already-accomplished target block analysis. So, once the mask pattern has been determined, a large reduction in the number of calculations necessary to compare other blocks with the target block is achieved. In other words, it is only necessary to calculate the positions of the prominent pixels for the target block, and not for each of the blocks against which it is being matched. Then a much-reduced group of pixels values in the target block is compared with pixel values of the same locations in the other blocks.

Referring now to FIG. 5, therein depicted is an 8×8 block of sample pixel luminance (i.e. "Y") values in the range of 1 through 9. Careful perusal thereof clearly indicates that the sixth column to the right thereof is substantially in the middle of a transition region between dim and bright (i.e. a luminance "edge"). One way to easily determine the existence of such an edge is to apply a specialized "slope" computation for all the pixels in the block that are not touching the outside edges of the block as follows.

For an internal pixel x surrounded by two vertically adjacent pixels with values a and c and two horizontally adjacent pixels with values d and b, to wit, for the pixel matrix $$\begin{matrix} a \\ d \times b \\ c \end{matrix}$$

define an internal slope $$S_I = (a-c)^2 + (b-d)^2.$$

Slopes associated with the pixels of the outside edges can also be defined as:

$$\begin{aligned} S_T &= (x-c)^2 + (b-d)^2 & \text{(top edge)} \\ S_L &= (a-c)^2 + (b-x)^2 & \text{(left edge)} \\ S_B &= (a-x)^2 + (b-d)^2 & \text{(bottom edge)} \\ S_R &= (a-c)^2 + (x-d)^2 & \text{(right edge)} \\ S_{TL} &= (x-c)^2 + (b-x)^2 & \text{(top left edge)} \\ S_{BL} &= (a-x)^2 + (b-x)^2 & \text{(bottom left corner)} \\ S_{TR} &= (x-c)^2 + (x-d)^2 & \text{(top right corner)} \\ S_{BR} &= (a-x)^2 + (x-d)^2 & \text{(bottom right corner)} \end{aligned}$$

These are useful when the block comes up against the edge of the picture.

FIG. 6 depicts a useful layout for an 8×8 block showing the edges and four internal sectors (along with an alpha-numeric system of identifying all individual pixels as shown).

FIG. 7 shows the internal slope values (calculated in accordance with the above-defined $S_I$) for the Y values of FIG. 5. The eight slope values of greatest magnitude are found in the pixels of column 6, along with pixels f5 and g5.

In accordance with the concept of Applicant's invention, FIG. 8 depicts a possible prominent pixel mask for the target block values of FIG. 5, with the H's representing "High" slope values. To make the method work even better, Applicant has observed that it is desirable to include in the mask a few pixel locations from several regions of the block. One such pixel location from each quadrant is shown picked in FIG. 8. These four pixel locations, labeled $L_1$, $L_2$, $L_3$, and $L_4$ are located at alpha-numeric locations b7, b2, g2, and g7 respectively as shown in FIG. 6. These are picked to give some consideration, i.e. "weight," to each of the internal quadrants I–IV of FIG. 7. The chosen mask, in this case, consists of the locations of eight "high-slope" pixels and four fixed location pixels. So, to perform block matching comparisons with the pixel values of the block of FIG. 5, other blocks' values are compared only in these special 12 pixel locations instead of all 64 of the respective blocks. This results in a major savings of computation time, while yielding comparable matching results vis-a-vis the "brute force" approach of the prior art.

Another useful technique is to use the pixel locations of the two highest slope values in each of the four quadrants. For the slopes of FIG. 7, a suitable mask would thus consist of the following eight pixel locations: c6, d6, b2, b3, f4, g4, e6, and f6.

It should be noted that the entire block of slope values for FIG. 7 can be calculated in accordance with the above-stated slope equations, and the corresponding prominent pixel mask can be used. The above-given example used only the "internal" slope values for reasons of increased efficiency in finding a suitable prominent pixel mask, keeping in mind that the edge pixel values are used in calculating the internal slope values (i.e. the edge pixel values are not ignored completely in the process of determining a suitable mask).

Another technique for finding the most prominent "features" of a block of pixel values is to use a "variance" calculation instead of a slope calculation on the pixel values of the target block. For example, for an "internal" pixel surrounded by adjacent horizontal and vertical pixels, to wit $$\begin{matrix} a \\ d \times b \\ c \end{matrix}$$

various "variance" measurements can be defined, for example, as follows:

$$V_1 = (x-a)^2 + (x-b)^2 + (x-c)^2 + (x-d)^2$$

and $$V_2 = |x-a| + |x-b| + |x-c| + |x-d|.$$

FIGS. 9 and 10 show the "internal" variance values, corresponding to these equations, for the pixel value block of FIG. 5. The reader will note that the prominent pixel masks that would be chosen using the $V_1$ or $V_2$ blocks of FIGS. 9 and 10 are substantially equivalent to the mask of FIG. 8 that was chosen by the previously-described "slope" technique. This is, of course, a special case, and generally the maps corresponding to S, $V_1$, and $V_2$ would vary somewhat. Nonetheless, the simple $V_2$ calculations can often be adequate for determining a useful (even if not ideal) prominent pixel mask. Another variance definition could be $$V_3 = (x - \tfrac{1}{2}a - \tfrac{1}{2}c)^2 + (x - \tfrac{1}{2}b - \tfrac{1}{2}d)^2.$$

Various combinations of S, $V_1$, $V_2$, and $V_3$ could also be used to determine a suitable mask. Those skilled in the art could also come up with several other similar ways to choose a prominent pixel mask that in some way characterizes the significant features of the target block. For example, hue values could be used instead of or in addition to luminance values.

Figure 11:
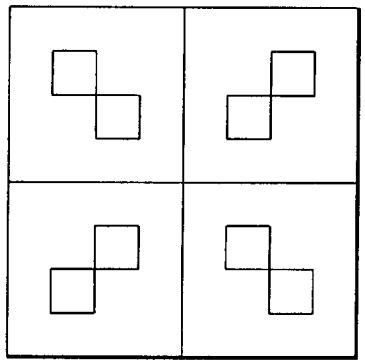
FIGS. 11–15 show possible target block masks that could be used if the target block does not have any significant identifying features.
Figure 13:
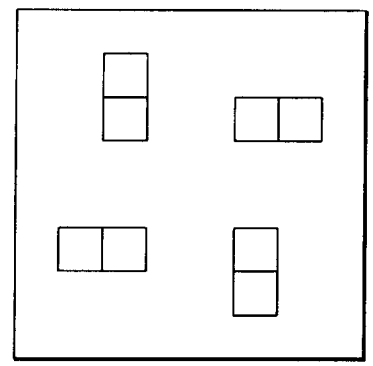
Figure 12:
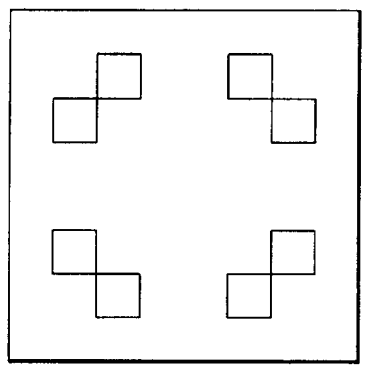
Figure 14:
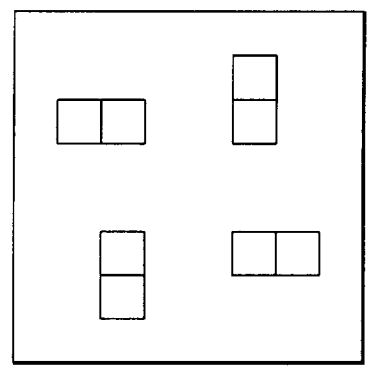
Figure 15:
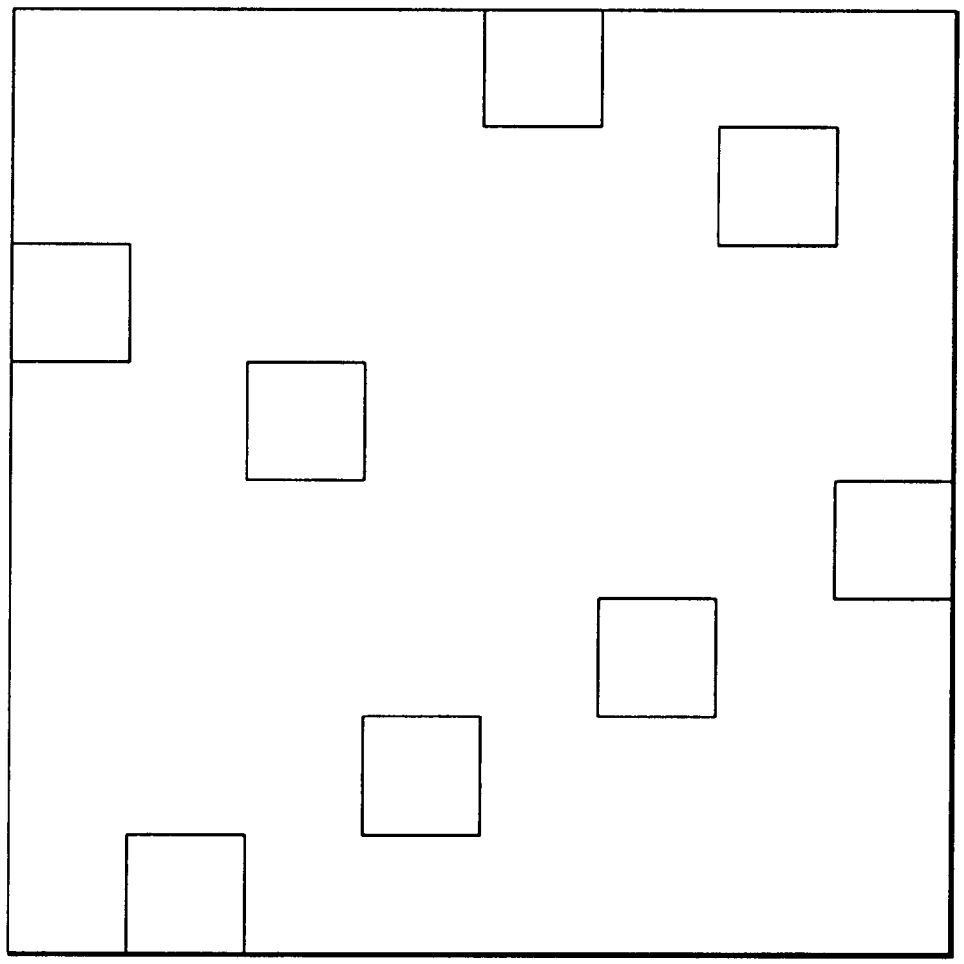

The above-described techniques are especially useful and powerful for target blocks that have special features. It is not uncommon, though, to encounter a substantially uniform target block, i.e. one that is nearly "featureless". In such cases, the corresponding S, $V_1$, or $V_2$ blocks will consist of all (or nearly all) zeros, and will therefore not be very useful in determining a suitable sampling mask. In these cases, a simple uniform target mask such as depicted in FIG. 11 or FIG. 15 can be employed to good effect. This works well for a single target block, but, if this technique is used over a large area of target blocks with the same regular mask pattern, it has been observed that a systematic interference between the pattern and the image structure may occur. For this reason it is better to alternate mask patterns, such as shown in FIGS. 11–15, in block-to-block sequential manner (or in a random or pseudo-random manner, as needed) to avoid such interference.

Although the invention has been described herein with regard to certain specific examples and preferred embodiments, the scope of the invention is not limited thereto, but rather is

What is claimed is:

1. In a motion-estimation digital video image compression system, a computer-implemented method for video pixel block matching, comprising the steps of:
   (a) identifying transition edge regions in a target block of pixel values to identify special, prominent features of the target block corresponding to said identified transition edge regions, said transition edge regions comprising special feature pixels, wherein the target block is one of a plurality of target blocks of a target image and the target block comprises the special feature pixels of the transition edge regions and general pixels which are not in the transition edge regions;
   (b) generating a target block special feature mask which identifies a plurality of target block mask pixels which are to be used for blockmatching pixel comparison, wherein the plurality of target block mask pixels comprises a plurality of the special feature pixels and not all of the general pixels; and
   (c) comparing only the target block mask pixel values with corresponding pixels of a second block of pixel values, to determine whether said target and second blocks are well-matched, wherein the second block is one of a plurality of blocks of a second image, whereby fewer comparisons are required than when all of the pixels of the target block are compared to corresponding pixels of the second block.

2. The method of claim 1, wherein step (a) comprises the step of identifying transition edge regions in the target block by performing at least one of variance calculations and slope calculations for pixel locations in said target block of pixel values.

3. The method of claim 2, wherein said slope calculations, for a particular pixel, are made with respect to pixel values in pixel locations horizontally and vertically adjacent to said particular pixel.

4. The method of claim 2, wherein said pixel locations comprise all internal pixel locations in said target block of pixel values.

5. The method of claim 4, wherein said transition edge regions are identified by performing a combination of said slope and variance calculations for pixel locations in said target block of pixel values.

6. The method of claim 1, wherein the plurality of target block mask pixels comprises all of the special feature pixels.

7. The method of claim 1, wherein:
   step (a) comprises the step of identifying transition edge regions in the target block by performing slope calculations for pixel locations in said target block of pixel values;
   the target block comprises a plurality of target block regions; and
   the plurality of target block mask pixels comprises, for each target block region, a subset of special feature pixels, for said each target block region, which have the highest slope values of said each target block region.

8. The method of claim 7, wherein:
   the plurality of target block regions are four target block quadrants; and
   the plurality of target block mask pixels comprises, for each target block quadrant, two of the special feature pixels for said each target block quadrant having the two highest slope values of special feature pixels in said each target block quadrant.

9. The method of claim 1, wherein:
   the target block comprises a plurality of target block regions; and
   the plurality of target block mask pixels comprises, in addition to the plurality of special feature pixels, at least one representative pixel value of the target block at a fixed location for each target block region.

10. The method of claim 1, wherein if no transition edge regions occur in said target block of pixel values, then a standard mask of pixel locations is used to determine which pixels will be compared in said target block and said second block.

11. The method of claim 10, wherein a plurality of different standard masks are used individually in temporal sequence for target blocks that have no transition edge regions and that are in close proximity to said target block.

12. In a motion-estimation digital video image compression system, an apparatus for video pixel block matching, comprising:
   (a) means for identifying transition edge regions in a target block of pixel values to identify special, prominent features of the target block corresponding to said identified transition edge regions, said transition edge regions comprising special feature pixels, wherein the target block is one of a plurality of target blocks of a target image and the target block comprises the special feature pixels of the transition edge regions and general pixels which are not in the transition edge regions;
   (b) means for generating a target block special feature mask which identifies a plurality of target block mask pixels which are to be used for block-matching pixel comparison, wherein the plurality of target block mask pixels comprises a plurality of the special feature pixels and not all of the general pixels; and
   (c) means for comparing only the target block mask pixel values with corresponding pixels of a second block of pixel values, to determine whether said target and second blocks are wellmatched, wherein the second block is one of a plurality of blocks of a second image, whereby fewer comparisons are required than when all of the pixels of the target block are compared to corresponding pixels of the second block.

13. The apparatus of claim 12, wherein means (a) comprises means for identifying transition edge regions in the target block by performing at least one of variance calculations and slope calculations for pixel locations in said target block of pixel values.

14. The apparatus of claim 12, wherein:
   means (a) comprises means for identifying transition edge regions in the target block by performing slope calculations for pixel locations in said target block of pixel values;
   the target block comprises a plurality of target block regions; and the plurality of target block mask pixels comprises, for each target block region, a subset of special feature pixels, for said each target block region, which have the highest slope values of said each target block region.

15. The apparatus of claim 12, wherein:
the target block comprises a plurality of target block regions; and
the plurality of target block mask pixels comprises, in addition to the plurality of special feature pixels, at least one representative pixel value of the target block at a fixed location for each target block region.

16. The apparatus of claim 12, wherein if no transition edge regions occur in said target block of pixel values, then a standard mask of pixel locations is used to determine which pixels will be compared in said target block and said second block.

17. In a motion-estimation digital video image compression system, an apparatus for video pixel block matching, comprising:
a processor; and
a memory coupled to the processor, wherein the memory stores a sequence of instructions which, when executed by the processor, cause the processor to perform the steps of:
(a) identifying transition edge regions in a target block of pixel values to identify special, prominent features of the target block corresponding to said identified transition edge regions, said transition edge regions comprising special feature pixels, wherein the target block is one of a plurality of target blocks of a target image and the target block comprises the special feature pixels of the transition edge regions and general pixels which are not in the transition edge regions;
(b) generating a target block special feature mask which identifies a plurality of target block mask pixels which are to be used for blockmatching pixel comparison, wherein the plurality of target block mask pixels comprises a plurality of the special feature pixels and not all of the general pixels; and
(c) comparing only the target block mask pixel values with corresponding pixels of a second block of pixel values, to determine whether said target and second blocks are well-matched, wherein the second block is one of a plurality of blocks of a second image, whereby fewer comparisons are required than when all of the pixels of the target block are compared to corresponding pixels of the second block.

18. The apparatus of claim 17, wherein step (a) comprises the step of identifying transition edge regions in the target block by performing at least one of variance calculations and slope calculations for pixel locations in said target block of pixel values.

19. The apparatus of claim 17, wherein:
step (a) comprises the step of identifying transition edge regions in the target block by performing slope calculations for pixel locations in said target block of pixel values;
the target block comprises a plurality of target block regions; and
the plurality of target block mask pixels comprises, for each target block region, a subset of special feature pixels, for said each target block region, which have the highest slope values of said each target block region.

20. The apparatus of claim 17, wherein:
the target block comprises a plurality of target block regions; and
the plurality of target block mask pixels comprises, in addition to the plurality of special feature pixels, at least one representative pixel value of the target block at a fixed location for each target block region.

21. In a motion-estimation digital video image compression system, a computer-implemented method for video pixel block matching, comprising the steps of:
(a) identifying transition edge regions in a target block of pixel values, wherein the target block comprises a plurality of target block regions and is one of a plurality of target blocks of a target image and the pixels of the transition edges comprise a proper subset of the pixel values of the target block;
(b) generating a target block special feature mask comprising a plurality of pixels of the transition edges and at least one representative pixel value of the target block at a fixed location for each target block region; and
(c) using the special feature mask to compare pixel values in said target block's transition edge regions and in the special feature mask with pixel values in corresponding regions of a second block of pixel values, to determine whether said target and second blocks are well-matched, wherein the second block is one of a plurality of blocks of a second image.

22. In a motion-estimation digital video image compression system, a computer-implemented method for video pixel block matching, comprising the steps of:
(a) identifying transition edge regions in a target block of pixel values by performing slope calculations for pixel locations in said target block of pixel values, wherein the target block comprises four target block quadrants and is one of a plurality of target blocks of a target image and the pixels of the transition edges comprise a proper subset of the pixel values of the target block;
(b) generating a target block special feature mask comprising, for each target block quadrant, two of the edge region pixel values for said each target block quadrant having the two highest slope values of edge region pixel values in said each target block quadrant; and
(c) using the special feature mask to compare pixel values in said target block's transition edge regions and in the special feature mask with pixel values in corresponding regions of a second block of pixel values, to determine whether said target and second blocks are well-matched, wherein the second block is one of a plurality of blocks of a second image.

23. In a motion-estimation digital video image compression system, an apparatus for video pixel block matching, comprising:
(a) means for identifying transition edge regions in a target block of pixel values, wherein the target block comprises a plurality of target block regions and is one of a plurality of target blocks of a target image and the pixels of the transition edges comprise a proper subset of the pixel values of the target block;
(b) means for generating a target block special feature mask comprising a plurality of pixels of the transition edges and at least one representative pixel value of the target block at a fixed location for each target block region; and
(c) means for using the special feature mask to compare pixel values in said target block's transition edge regions and in the special feature mask with pixel values in corresponding regions of a second block of pixel values, to determine whether said target and second blocks are well-matched, wherein the second block is one of a plurality of blocks of a second image.

* * * * *